Dec. 29, 1936.　　　　B. KASIK　　　　2,065,591
DRIP PAN FOR SCRUB PAILS
Filed Feb. 23, 1934
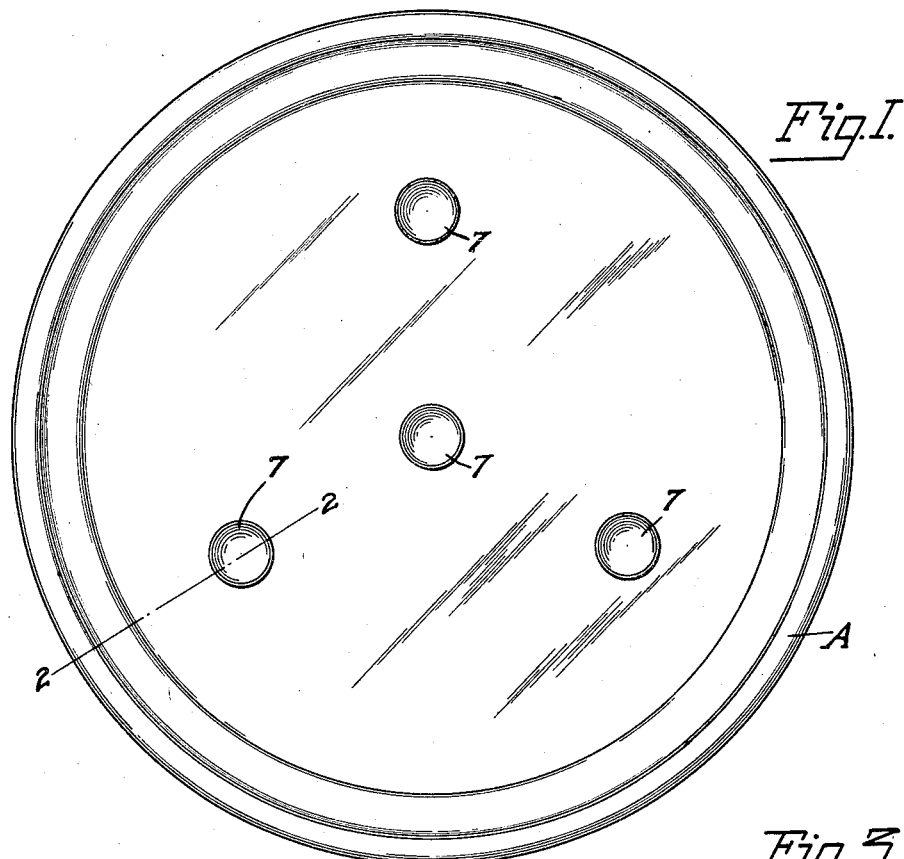
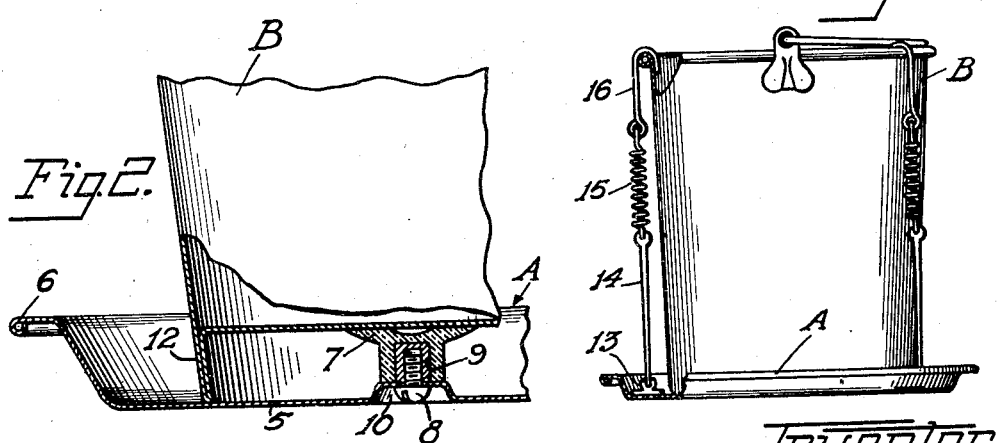
Inventor:
Bertha Kasik
By George E. Mueller
Atty.

Patented Dec. 29, 1936

2,065,591

UNITED STATES PATENT OFFICE 2,065,591

DRIP PAN FOR SCRUB PAILS

Bertha Kasik, Chicago, Ill.

Application February 23, 1934, Serial No. 712,469

4 Claims. (Cl. 220—69)

My invention relates to drip pans for scrub pails, an object being to provide a pan of this character which may be readily applied to or removed from the bottom of a scrub pail to prevent dripping of the water onto the floor, also to prevent marking of the floor or rug with a wet pail bottom, and to provide a flange adapted to receive a bar of soap.

Ordinarily in the use of scrub pails, water will drip or run down the side of the pail and onto the floor or will wet the bottom rim of the pail so as it is moved along on the cleaned floor, will leave wet marks or unsightly rings on the clean floor or rug. Also where soap is used, no place is provided to receive the same and it is deposited on the floor.

To prevent these difficulties I have provided a comparatively light sheet metal pan having means attached thereto for readily removably securing the pan to the pail bottom so that the pail firmly rests thereon with the parts so disposed that any water dripping from the pail rim or down its side will be received in the drip pan and thus maintain a clean dry bottom surface, and with the pan extending sufficiently beyond the pail to serve as a receptacle for the soap.

For a better understanding of my invention, reference is to be had to the accompanying drawing in which:

Fig. 1 is a plan view of one form of pan with suction cups disposed around its surface;

Fig. 2 is a sectional view along the line 2—2 of Fig. 1 but with a portion of a pail shown thereon; and Fig. 3 is a modified form of holding means.

Referring now to the preferred form of the invention as shown in Figs. 1 and 2, I provide a pan A preferably of light sheet metal having a bottom 5 extending upwardly as an outer wall or rim 6. Secured to the pan bottom are a number of rubber suction cups 7 suitably disposed around the bottom of the pan so as to adhere to the bottom of the pail when it is set down on the pan. These cups are preferably secured to the pan bottom by means of a screw 8 which threads up into a metallic bushing 9 cast into the cup. The bottom of the pan is preferably depressed at 10 so that the screw head will be clear and not touch the floor. In order to rigidly support the pail B so that it will not tip when resting on the pan, I preferably make the suction cups 7 of such a height that they will engage the bottom 11 of the pail and allow the outer rim 12 thereof to contact with and rest upon the pan bottom. Thus it is only necessary to set the pail down upon the pan and the pan will be held to the pail so that it may be lifted or shoved along the floor and being maintained dry upon its lower or resting surface does not leave the unsightly wet marks or rings upon the floor such as ordinarily result when no protection is provided.

In Fig. 3 I have shown a modified form of attaching means which are also disposed around the pail to removably connect the pan and pail but at the same time prevent the drip water from running down onto the floor. To this end, I attach a number of eyelets 13 just inside of the peripheral edge of the pan and in each of the eyelets I pivotally connect a link 14 extending through a spring 15 to a hook 16. I preferably provide three such hook members although more or less may be used as desired.

Although I have described my invention in its preferred embodiments, it is understood that I am not limited thereby but am limited only by the scope of the appended claims.

What I claim as new and desire to protect by Letters Patent of the United States is:

1. As an article of manufacture, a drip pan for scrub pails having bottom rims comprising a thin sheet metal pan adapted to set beneath a pail and large enough to catch drippings therefrom, and a plurality of rubber suction cups secured to the pan and disposed to engage the pail bottom, said cups being of a height to permit the pail bottom rim to engage and rest on the pan.

2. As an article of manufacture, a drip pan for scrub pails having bottom rims comprising a thin sheet metal pan adapted to set beneath a pail and large enough to catch drippings therefrom, a plurality of rubber suction cups on the pan and disposed to engage the pail bottom, a metallic bushing in each of said cups cooperating to secure said cup to the pan and providing a metallic vertical support for said cup, said cups being of a height to permit the pail bottom rim to engage and rest on the pan.

3. As an article of manufacture, a drip pan for scrub pails having bottom rims comprising a thin sheet metal pan adapted to set beneath a pail and large enough to catch drippings therefrom, a plurality of raised portions on the top surface of said pan forming depressions on the under side thereof, a rubber suction cup on each raised portion disposed to engage the pail bottom, a metallic bushing in said cup for receiving a screw extending up through the raised portion to secure said cup thereto.

4. The combination of a pail and a sheet metal drip pan beneath said pail large enough to catch the drippings therefrom and having a rubber suction cup secured to said pan and upstanding therefrom and adhering by suction to the bottom of said pail, outer portions of the pail bottom resting rigidly on portions of the pan, said portions preventing said pail from rocking while resting thereon, and said suction cup removably securing said pan to said pail.

BERTHA KASIK.